United States Patent
Prentice et al.

(10) Patent No.: US 10,789,684 B2
(45) Date of Patent: Sep. 29, 2020

(54) METHOD, APPARATUS, AND SYSTEM FOR MULTILEVEL BILATERAL NOISE FILTERING

(71) Applicant: Carl Zeiss AG, Oberkochen (DE)

(72) Inventors: Wayne E. Prentice, Honeoye Falls, NY (US); Tanja Teuber, Aalen (DE); David Abreu, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 72 days.

(21) Appl. No.: 16/006,605

(22) Filed: Jun. 12, 2018

(65) Prior Publication Data
US 2019/0378246 A1   Dec. 12, 2019

(51) Int. Cl.
| | | |
|---|---|---|
| G06T 5/00 | (2006.01) | |
| G06T 5/20 | (2006.01) | |
| G06T 3/40 | (2006.01) | |
| H04N 9/04 | (2006.01) | |

(52) U.S. Cl.
CPC ............ *G06T 5/002* (2013.01); *G06T 3/4015* (2013.01); *G06T 5/20* (2013.01); *H04N 9/045* (2013.01); *G06T 2207/20028* (2013.01); *H04N 2209/045* (2013.01)

(58) Field of Classification Search
CPC ......... G06T 5/002; G06T 3/4015; G06T 5/20; G06T 2207/20028; H04N 9/045; H04N 2209/045
See application file for complete search history.

(56) References Cited

U.S. PATENT DOCUMENTS

| | | |
|---|---|---|
| 2005/0244052 A1 | 11/2005 | Keshet et al. |
| 2005/0281458 A1 | 12/2005 | Adams, Jr. et al. |
| 2007/0165962 A1 | 7/2007 | Smirnov et al. |
| 2014/0002697 A1* | 1/2014 | Tai .......................... H04N 9/68 348/242 |
| 2014/0098265 A1 | 4/2014 | Hosaka |
| 2017/0011497 A1 | 1/2017 | Chien et al. |

OTHER PUBLICATIONS

C. Tomasi et al., Bilateral Filtering for Gray and Color Images, Proceedings of the 1998 IEEE International Conference on Computer Vision, Bombay, India (1998).
E. Akuiyibo et al., Demosaicking using Adaptive Bilateral Filters, EE 362, Winter (2006).

(Continued)

*Primary Examiner* — Twyler L Haskins
*Assistant Examiner* — Fayez Bhuiyan
(74) *Attorney, Agent, or Firm* — Falk Ewers; Ewers IP Law PLLC (57) ABSTRACT

A method, an image processing apparatus, and computer program product for multilevel bilateral noise filtering of digital images are provided. The method includes receiving from an image sensor an image frame including a color mosaic having a color filter array (CFA) pattern, decomposing the image frame into at least one color plane image for each of a plurality of color planes, sequentially and separately reducing noise in the at least one color plane image by performing multilevel bilateral noise filtering of the at least one color plane image, and reconstructing the at least one color plane image to generate a noise filtered image frame.

20 Claims, 7 Drawing Sheets

(56) References Cited

OTHER PUBLICATIONS

M. Zhang et al., Multiresolution Bilateral Filtering for Image Denoising, IEEE Transactions on Image Processing, vol. 17, No. 12, Dec. 2008.
B. Goossens et al., Removal of Correlated Noise by Modeling the Signal of Interest in the Wavelet Domain, IEEE Transactions on Image Processing, vol. 18, No. 6, Jun. 2009.
Matlab Project: Post 9: Multiresolution Bilateral Filters, GeekyCody, Mar. 5, 2016, at http://geekycody.com/2016/03/05/matlab-project-post-9-multiresolution-bilateral-filters/.
S. M. Hazavei et al., Using Complex Wavelet Transform and Bilateral Filtering for Image Denoising, Feb. 2017.
International Search Report and Written Opinion of the European Patent Office dated Oct. 2, 2019 of International counterpart application PCT/EP2019/065297.
Kishan Harini et al: Patch-based and multiresolution optimum bilateral filters for denoising images corrupted by Gaussian noise, Journal of Electronic imaging, vol. 24, No. 5, Sep. 1, 2015, p. 53021.

* cited by examiner

METHOD, APPARATUS, AND SYSTEM FOR MULTILEVEL BILATERAL NOISE FILTERING

TECHNICAL FIELD

The invention relates to multilevel bilateral noise cleaning of digital images. Further, the invention relates to an apparatus and a system performing multilevel bilateral noise cleaning of digital images.

BACKGROUND

Digital cameras include image sensors to capture digital images. Image sensors detect a light intensity per pixel. To allow color information to be recorded, color filter arrays (CFA) may be bonded to the substrate of the image sensor which allocate a certain color to a certain pixel, and each pixel detects the light intensity for the specific color.

A typical pattern for a CFA used in digital cameras is a Bayer filter or Bayer CFA. A Bayer filter contains alternating rows of red and green filters and blue and green filters, wherein each row contains alternating red and green filters and blue and green filters, respectively. Green filters preferentially allow green light photons to pass to the detector (e.g., a photodiode) of the respective pixel of the image sensor. At the same time, red and blue light photons that arrive at the green filter are not transmitted by the filter and, therefore, not detected by the respective detector. Similarly, red filters preferentially allow red light photons and blue filters preferentially allow blue light photons to pass to the respective detector.

In a Bayer CFA, green filters occur at twice the spatial frequency of the red and blue filters. The green channel represents the luminance and the red and blue channels represent the chrominance of the digital image. When a Bayer filter is applied in front of an image sensor, the resulting image frame produced by the image sensor needs to be interpolated or demosaiced to reproduce all three colors for each pixel so that the original full-color resolution digital image can be displayed, printed or stored.

In digital cameras, interpolating or demosaicing may be performed by specialized image signal processors (ISPs), or by general purpose processors (CPUs) which execute image processing software programs.

Digital images typically contain noise from various sources that needs to be reduced. The need for reduction increases with International Organization for Standardization (ISO) sensitivity.

One of the noise components is fixed pattern noise (FPN), which has a spatial pattern that does not vary with time. Another noise component is temporal noise, which has a spatially varying pattern that varies with time. The overall noise characteristics in a digital image depend, for example, on the sensor type, pixel dimensions, temperature, exposure time, and ISO sensitivity. Image noise is also channel dependent, as discussed in Zhang, et. al., *Multiresolution Bilateral Filtering for Image Denoising*.

Various image denoising methods have been developed. One of these methods utilizes bilateral filtering. Bilateral filtering smooths images while preserving edges by a non-linear combination of nearby image values. The method is generally described, e.g., in Tomasi et. al., *Bilateral Filtering for Gray and Color Images*.

While bilateral filtering is generally known for a number of applications including bilateral noise cleaning, it was first proposed as an intuitive tool, and parameters, such as the parameters controlling the fall-off of the weights in the spatial and intensity domains are typically selected by trial and error. See Zhang, et. al., *Multiresolution Bilateral Filtering for Image Denoising*.

In particular, existing noise cleaning procedures attempt to clean noise in a space where the noise has been mixed from either demosaicing or channel mixing as part of the color correction processing. As a result, noise is not necessarily uncorrelated for different pixels which results in unsatisfactory noise cleaning. Therefore, new approaches are needed which improve the effectiveness of bilateral noise filtering applied to a digital image.

SUMMARY

It is an object of the invention to provide a method, an image processing apparatus, and a computer-readable storage medium for noise filtering digital images that overcome the disadvantages of the related art. The object is achieved by providing multilevel bilateral noise filtering techniques that allow effective removal of noise in all spatial frequency bands.

Bilateral filters remove noise by creating a weighted average of neighborhood pixels defined by a kernel size and shape. According to an aspect of the invention, the kernel is centered upon a target pixel I(x,y). Two predictors are used when computing the weights for a target pixel mean, namely the distance of the kernel pixel from the target pixel, and the z-score of the target pixel defining a similarity or difference of a value of the kernel pixel to the value of the target pixel.

Bilateral filters act upon a group of pixels defined by the spatial weight. Typically, this size is only a few pixels wide and the image noise is broad band (spectrally flat). It has been determined that the bilateral filter is effective for high frequency noise, but because the support is only a few pixels, only high frequency noise is attenuated, leaving low frequency noise behind.

With regard to the distance of the kernel pixel from the target pixel, closest pixels to the target pixel have the most weight. With regard to the similarity or difference of a value of the kernel pixel to the value of the target pixel, pixels closest in value to the target pixel have the most weight.

At each target pixel I(x,y), weights are determined for each pixel, p within the kernel according to the following equation:

$$\text{Weights}(\rho) = \sum_{\rho \in Kernel} e^{-\left(\frac{(\Delta r)^2}{2*r^2} + \left(\frac{\Delta v}{\sigma \cdot [I(x,y)]}\right)^2\right)} \quad (1)$$

The output value of a target pixel is determined in accordance with the following equations:

$$I(x, y)_{Out} = \frac{1}{n} \cdot \text{Weights}(\rho) \cdot I(\rho) \quad (2)$$

$$n = \sum_{\rho \in Kernel} \text{Weights}(\rho) \quad (3)$$

For a target pixel I(x,y) centered in a kernel, $\Delta r$ is the distance in pixels, as measured from the original CFA, from I(x,y) to another pixel in the kernel. Parameter r is a Gaussian radius parameter. $\Delta v$ is a code value difference between the target pixel I(x,y) and another pixel in the kernel. σ is the standard deviation of the target pixel with intensity I(x,y). The evaluation is performed for all I(p) values within the kernel.

The pixel value difference is scaled by the standard deviation of I(x,y). Scaling the pixel value difference by the standard deviation of I(x,y) is a further enhancement to implementations of the bilateral filter in the related art. This ensures that the strength of the noise cleaning is consistent with the expected noise in every portion of the digital image. The relationship between image code values and the noise (standard deviation) is stored in a noise table that is provided to the noise filter. This noise table σ[I(x,y)] is computed from knowledge of the specific capture system parameters or empirically measured from calibrated image data. In the noise table σ[I(x,y)], the standard deviation at every integer value of I(x,y) is recorded.

These modifications to the bilateral filter(s) significantly improve the effectiveness of the noise cleaning process in the image processing apparatus and thereby the overall functionality of the image processing apparatus in which they are used.

It has been determined that noise cleaning is most effective when the noise is un-correlated. In the context of a digital camera processing path, most un-correlated noise occurs before CFA interpolation and before the matrix mixing is performed in color correction. Therefore, the bilateral filter(s) according to an aspect of the invention is/are adapted to operate directly in a pre-interpolated CFA space, i.e., before the digital image is interpolated or demosaiced and the distances used are consistent with the spatial gaps that exist for any given color in the image record. In other words, according to an aspect of the invention, a new arrangement is provided in which the bilateral filtering is performed on color plane images that are generated by decomposing an image frame received from an image sensor that includes a color mosaic having a CFA pattern.

The z-score predictor requires an estimate of the standard deviation of the image data and the standard deviation may be determined empirically from the device and not estimated from the data.

According to a first aspect of the invention, a method for multilevel bilateral noise filtering of digital images is provided. The method includes receiving from an image sensor an image frame including a color mosaic having a CFA pattern, decomposing the image frame into at least one color plane image for each of a plurality of color planes, sequentially and separately reducing noise in the at least one color plane image by performing multilevel bilateral noise filtering of the at least one color plane image, and reconstructing the at least one color plane image to generate a noise filtered image frame.

According to a second aspect of the invention, an image pre-processing apparatus is provided which includes one or more processors in communication with an image sensor and one or more memory devices in communication with the one or more processors. The one or more processors are configured to receive from the image sensor an image frame including a color mosaic having a CFA pattern, decompose the image frame into at least one color plane image for each of a plurality of color planes, sequentially and separately reduce noise in the at least one color plane image by performing multilevel bilateral noise filtering of the at least one color plane image, and reconstruct the at least one color plane image to generate a noise filtered image frame.

According to a third aspect of the invention, a non-transitory computer readable storage medium is provided. The non-transitory computer readable storage medium is encoded with software including computer executable instructions that when executed by one or more processors cause the one or more processors to receive from the image sensor an image frame including a color mosaic having a CFA pattern, decompose the image frame into at least one color plane image for each of a plurality of color planes, sequentially and separately reduce noise in the at least one color plane image by performing multilevel bilateral noise filtering of the at least one color plane image, and reconstruct the at least one color plane image to generate a noise filtered image frame.

BRIEF DESCRIPTION OF THE DRAWINGS

The invention will now be described with reference to the drawings, wherein.

DESCRIPTION OF EXEMPLARY EMBODIMENTS

Figure 1:
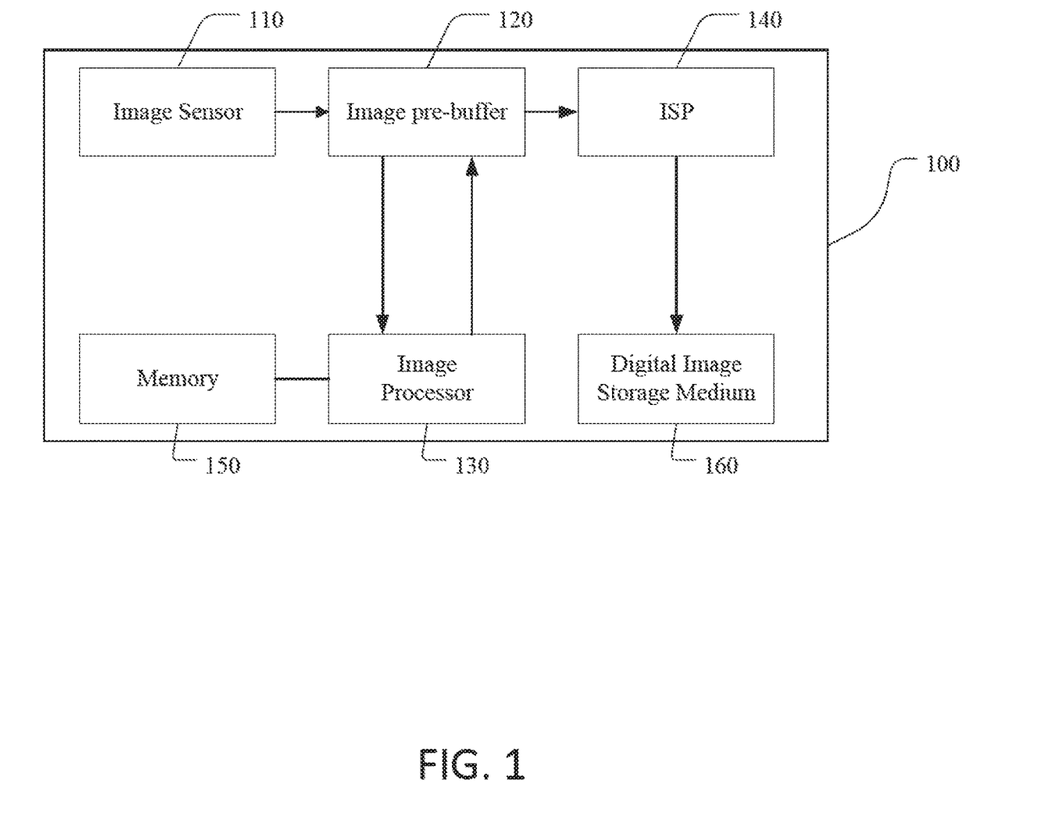
FIG. 1 shows a schematic illustration of an image processing apparatus according to an exemplary embodiment of the invention.

FIG. 1 shows an image processing apparatus 100 configured for multi-level bilateral noise filtering of digital images. The image processing apparatus 100 includes an image sensor 110, an image pre-buffer 120 connected to the image sensor 110 and to image processor 130 and Image Signal Processor (ISP) 140. Image processing apparatus 100 further includes memory 150 which is in communication with image processor 130. The image processing apparatus 100 further includes digital image storage medium 160 which is in communication with ISP 140.

The image sensor 110 can be operated in a live view mode and in a still capture mode. In both modes, the full active area of the image sensor 110 is utilized, and an image frame is generated and outputted by the image sensor 110 to the image pre-buffer 120.

The memory 150 and the digital image storage medium 160 are non-transitory computer readable storage media, for example, solid-state drives (SSD), but are not limited thereto. Any other non-transitory computer readable storage medium or a plurality of non-transitory computer readable storage media can be also utilized as the memory 150 or the digital image storage medium 160.

Figure 2:
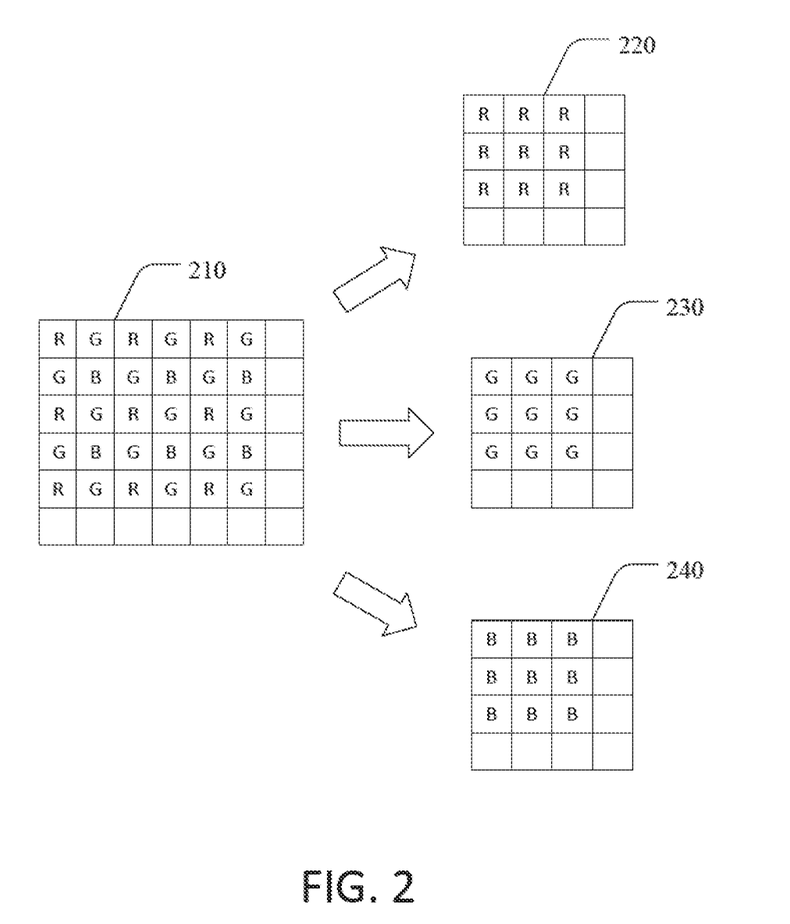
FIG. 2 shows an illustration of a plane separation according to an exemplary embodiment of the invention.

Reference is now made to FIG. 2 (with further reference to FIG. 1). FIG. 2 shows an illustration of plane separation. A CFA, and in particular a Bayer CFA may be bonded to image sensor 110. As a result, the image frames generated by the image sensor 110 include a color mosaic with a Bayer CFA pattern. FIG. 2 shows a portion of an image frame 210 which is received from the image sensor 110 and stored in image pre-buffer 120. As shown in FIG. 2, the image frame 210 includes alternating rows of red and green pixels and of blue and green pixels. Pixels of the same color represent a color plane or color channel. The Bayer CFA pattern is decomposed into three color plane images, namely, the red color plane image 220, the green color plane image 230, and the blue color plane image 240 by the image processor 130 prior to the noise cleaning to permit each color plane to be cleaned independently. The green channel represents the luminance of the digital image and the red and blue channels represent the chrominance of the image frame 210. As shown in FIG. 2, the green plane has a structure that is different from the red and blue planes with regard to the distance between adjacent pixels of the same color. For an image frame with a certain pixel width and a pixel height, the dimensions of the red and blue planes can be described as follows: for a dimension of the image frame 210 defined by pixel width×pixel height, the dimension of the red color plane image 220 and of the blue color plane image 240 is pixel width/2×pixel height/2, and the dimension of the green color plane image 230 is pixel width/2×pixel height. A distance $\Delta r$ in pixels from a kernel pixel used for noise reduction, as described in more detail below, is calculated for all red plane rows and blue plane rows based on the following equation:

$$\Delta r = \sqrt{(2 \cdot \Delta \text{Rows})^2 + (2 \cdot \Delta \text{Columns})^2} \qquad (4)$$

The distance $\Delta r$ in pixels from a kernel pixel for even green plane rows is calculated based on the following equation:

$$\Delta r = \sqrt{\Delta \text{Rows}^2 + (2 \cdot \Delta \text{Columns})^2} \qquad (5)$$

The distance $\Delta r$ in pixels from a kernel pixel for odd green plane rows is calculated based on the following equation:

$$\Delta r = \sqrt{\Delta \text{Rows}^2 + (2 \cdot \Delta \text{Columns} + 1)^2} \qquad (6)$$

As a result, the distances $\Delta r$ as measured on the extracted red, blue, and green planes are consistent with the CFA pixel distances of the image frame 210.

After decomposing the image frame 210 into the red, green, and blue color plane images, the image processor 130 sequentially and separately reduces noise in each of the color planes by performing multilevel bilateral noise filtering of the red, green, and blue color plane images 220, 230, and 240, respectively. Thereafter, the image processor 130 reconstructs the red, green, and blue color plane images 220, 230, and 240, respectively, to generate a noise filtered image frame that is stored by the image processor 130 in the image pre-buffer 120. Subsequently, the noise filtered image frame is transmitted to ISP 140 where it is interpolated or demosaiced to a viewable image and stored in digital image storage medium 160.

Figure 3:
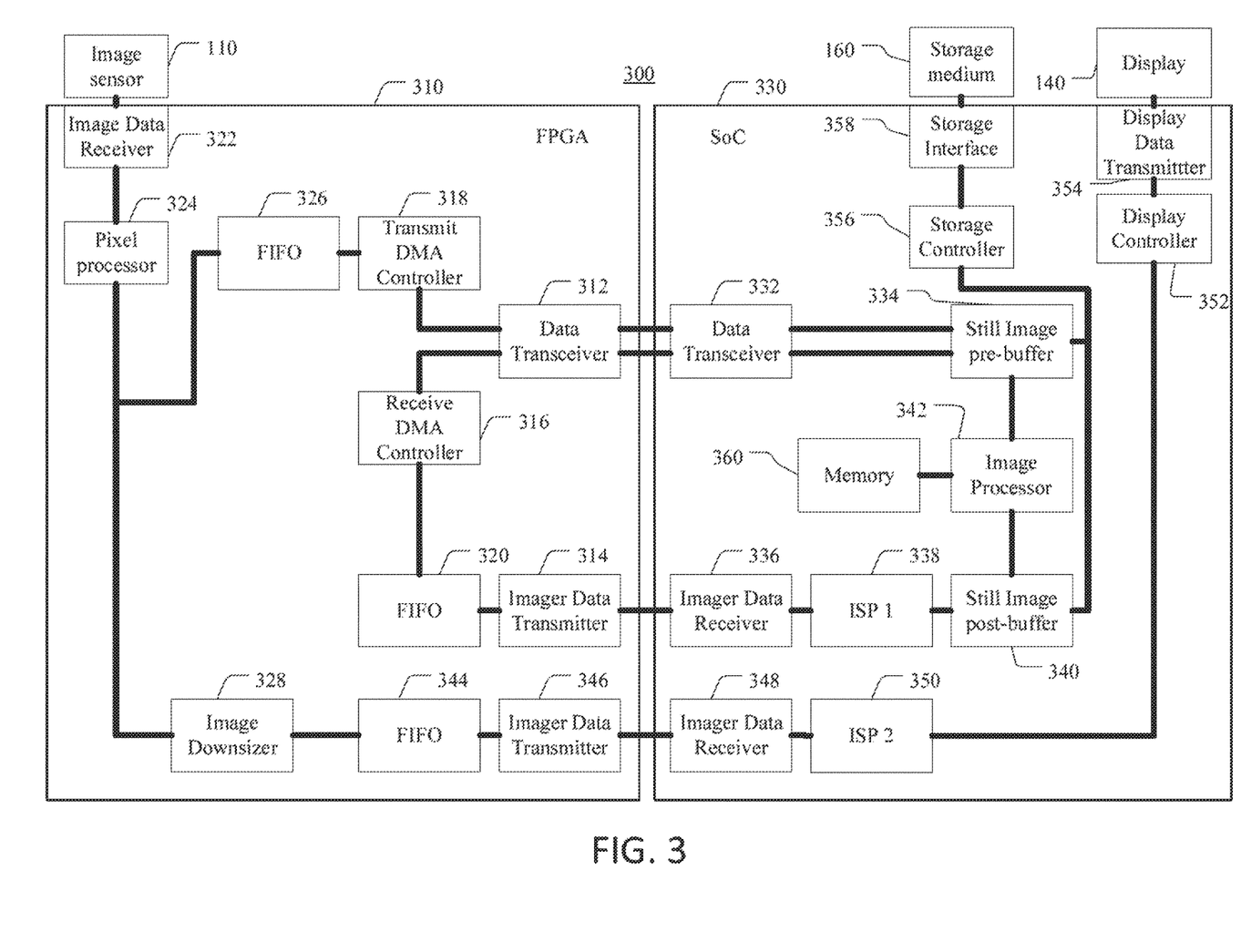
FIG. 3 shows a detailed schematic illustration of an image processing apparatus according to an exemplary embodiment of the invention.

Reference is now made to FIG. 3, which shows a more detailed schematic illustration of an image processing apparatus 300 for processing digital images according to an exemplary embodiment of the invention. As shown in FIG. 3, the image processing apparatus 300 includes an image pre-processing device 310 to which image sensor 110 is connected, and an image main processing device 330. The image main processing device 330 is in communication with image pre-processing device 310, display 140, and storage medium 160.

The image main processing device 330 in the exemplary embodiment of the image processing apparatus 300 shown in FIG. 3 has a system on chip (SoC) architecture and integrates all components necessary to process an image frame received from an image sensor to generate digital images that can be displayed, printed or stored. Thus, image main processing device 330 includes image processor 342 which may be implemented, for example, as a digital signal processor (DSP) or a graphics processing unit (GPU). Image main processing device 330 further includes a first ISP 338 and data transceiver 332 configured to receive and transmit image frames to be stored in still image pre-buffer 334. In addition, an image data receiver 336 is provided which is configured to receive image subframes to be processed by the ISP 338. The image subframes processed by the ISP 338 are stored in still image post-buffer 340. A display controller 352 is provided which performs operations to allow the image frame captured by the image sensor 110 to be visible on the entire display 140. The display controller 352 is connected to the display 140 via display data transmitter 354. To store still image frames in a graphics image format or image frames in a raw image format in the storage medium 160, a storage controller 356 and a storage interface 358 are provided.

The image pre-processing device 310 includes a data transceiver 312 and a first imager data transmitter 314. Data transceiver 312 and data transceiver 332 form a data interface between the image pre-processing device 310 and the image main processing device 330. The data transceiver 312, 332 may be a high-speed serial computer expansion bus standard interface, such as a Peripheral Component Interconnect Express (PCIe) standard interface, but is not limited thereto.

Like the data transceiver 312, 332, the imager data transmitter 314 together with the imager data receiver 336 form another interface (i.e., an imager data interface) between the image pre-processing device 310 and the image main processing device 330. Data transceiver 312 and imager data transmitter 314 are controlled by receive DMA (RDMA) controller 316 and transmit DMA (TDMA) controller 318. RDMA controller 316 is in communication with imager data transmitter 314 via first in first out (FIFO) buffer 320. Image pre-processing device 310 also includes image data receiver 322 and pixel processor 324 which is in communication with transmit DMA controller 318 via FIFO buffer 326.

The first and second imager data interfaces 314, 336 and 346, 348 according to the exemplary embodiment shown in FIG. 3 are Mobile Industry Processor Interface (MIPI) Camera Serial Interface (CSI) image data interfaces. The imager data interfaces, however, are not limited to MIPI CSI and any other serial interfaces can also be utilized instead.

In the exemplary embodiment shown in FIG. 3, the image pre-processing device 310 is implemented as a field-programmable gate array (FPGA). However, the image pre-processing device 310 may also be implemented as an application-specific integrated circuit (ASIC). Similarly, the image processor 342 may also be implemented as a separate FPGA or a separate ASIC.

Image pre-processing device 310 further includes image downsizer 328 that is connected via FIFO buffer 344 to a second imager data transmitter 346 that forms together with a second imager data receiver 348 a second imager data interface. The imager data receiver 348 is connected to a second ISP 350.

Noise filtering is performed by image processor 342. An image frame 210 generated by the image sensor 110 is stored in still image pre-buffer 334 before it is decomposed by image processor 342 into color plane images in which noise is sequentially and separately reduced by the image processor 342 before the color plane images are reconstructed to generate a noise filtered image frame that is stored in still image pre-buffer and thereafter transmitted to ISP 338 via data transceiver 332 and 312 and imager data transmitter 314 and imager data receiver 336 where it is interpolated or demosaiced to a viewable image and stored in digital image storage medium 160.

Figure 4:
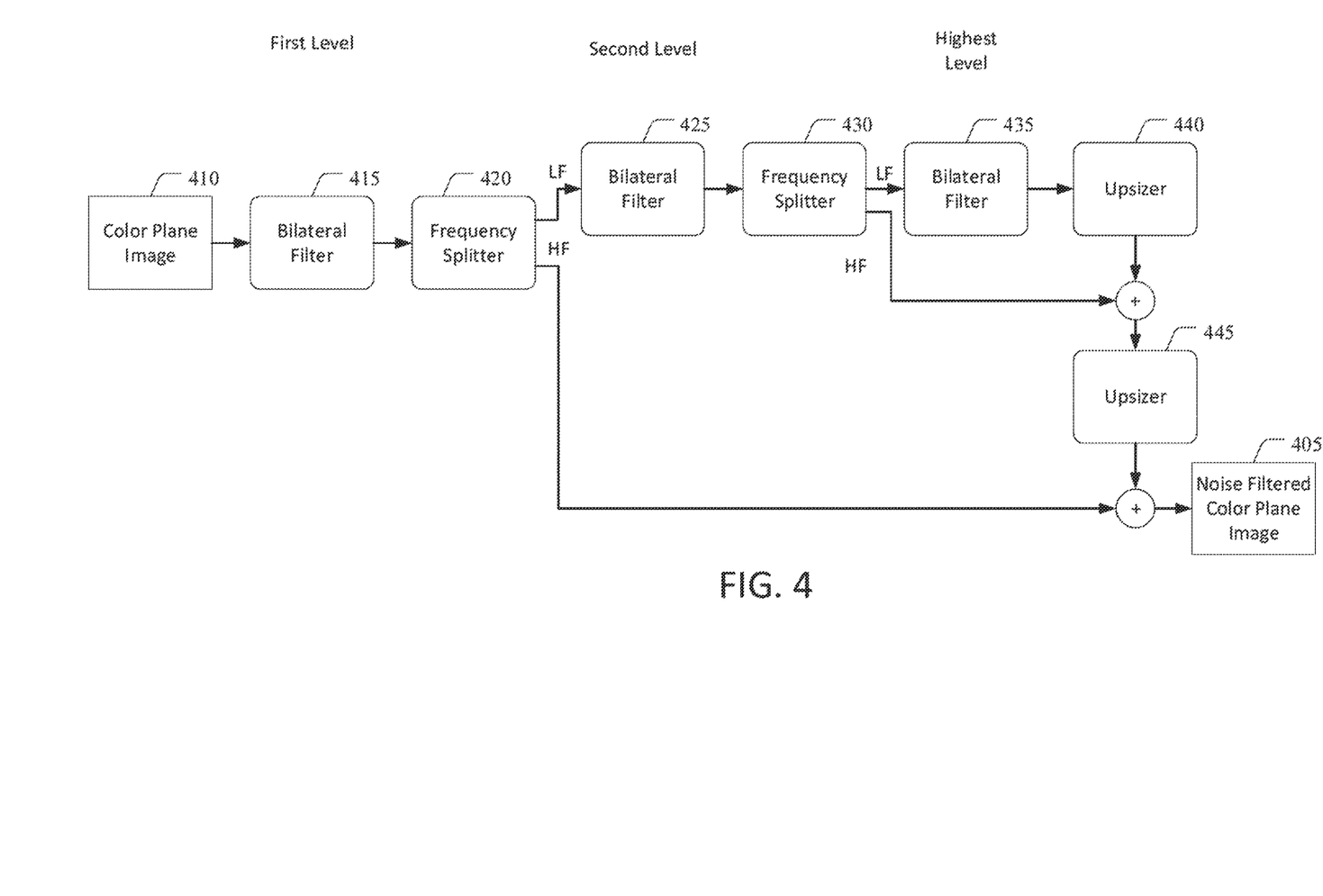
FIG. 4 shows a schematic illustration of a method for noise filtering digital images according to an exemplary embodiment of the invention.

Referring now to FIG. 4 (with continued reference to FIGS. 1 to 3). FIG. 4 is a schematic illustration of a method for noise filtering digital images according to an exemplary embodiment of the invention. More specifically, FIG. 4 illustrates a method for sequentially reducing noise in a color plane by separately performing multilevel bilateral noise filtering by image processors 130, 342. The method shown in FIG. 4 generates noise filtered color plane images 405 for each color plane, which are subsequently combined to generate a noise filtered image that is demosaiced by ISPs 140, 338 and stored in storage medium 160.

To perform multilevel bilateral noise filtering, a plurality of noise cleaning levels is defined. FIG. 4 illustrates a first, second and highest noise cleaning level. However, the method is not limited thereto. Instead, the number of noise cleaning levels may be increased to four or more noise cleaning levels.

At the first level shown in FIG. 4, the color plane image 410 is bilaterally filtered by bilateral filter 415. To bilaterally filter the color plane image 410, a kernel of a target pixel is defined. The kernel has a square width size and includes the target pixel and kernel pixels. Subsequently, each pixel of the at least one color plane image is processed as the target pixel by determining a weighted averaged pixel value for the target pixel. The weighted averaged pixel value for the target pixel is determined by applying weights to values of each kernel pixel and by subsequently averaging the weighted kernel pixel values.

A weight for a kernel pixel is determined based on a distance of the kernel pixel from the target pixel and based on a z-score defining a similarity of the value of the kernel pixel to the value of the value of the target pixel. The distance of the kernel pixel from the target pixel is determined to be consistent with spatial gaps in the color mosaic having the CFA pattern.

The weight for the kernel pixel is determined in accordance with the following equation:

$$\text{Weights}(\rho) = \sum_{p \in Kernel} e^{-\left(\left(\frac{\Delta r}{\sqrt{2} \cdot ThrottleR\_ML}\right)^2 + \left(\frac{\Delta v}{\sigma[I(x,y)] \cdot ThrottleS\_ML\cdot 2^{-level}}\right)^2\right)} \quad (7)$$

wherein ThrottleR_ML defines a Gaussian radius control, ThrottleS_ML defines a pixel difference control, Δr defines a distance in pixels from the kernel, I(x,y) defines the target pixel centered in the kernel, Δv defines a code value difference, σ[I(x,y)] defines a noise table, and level defines the noise cleaning level. Thus, the bilateral filter 415 in FIG. 4 determines the weights for the first level, the bilateral filter 425 determines the weights for the second level and the bilateral filter 435 determines the weights for the highest level, i.e., the third level in the exemplary embodiment shown in FIG. 4.

The bilaterally filtered color plane image is provided to frequency splitter 420. Frequency splitter 420 divides the bilaterally filtered color plane image into a first level low frequency color plane image and a first level high frequency color plane image. Frequency splitting is described in further detail in conjunction with FIGS. 5 and 6 below.

The first level low frequency color plane image is bilaterally filtered by second level bilateral filter 425 and thereafter provided to second level frequency splitter 430 where it is divided into a second level low frequency color plane image and a second level high frequency color plane image.

At the highest level in FIG. 4, the second level low frequency color plane image is bilaterally filtered by bilateral filter 435 and upsized by upsizer 440. Pixel values of the upsized color plane image output by upsizer 440 are added to respective pixel values of the second level high frequency color plane image, and the resulting color plane image is upsized again by upsizer 445 before the pixel values of the upsized color plane image output by upsizer 444 are added to respective pixel values of the first level high frequency color plane image generated by frequency splitter 420 to generate noise filtered color plane image 405.

Figure 5:
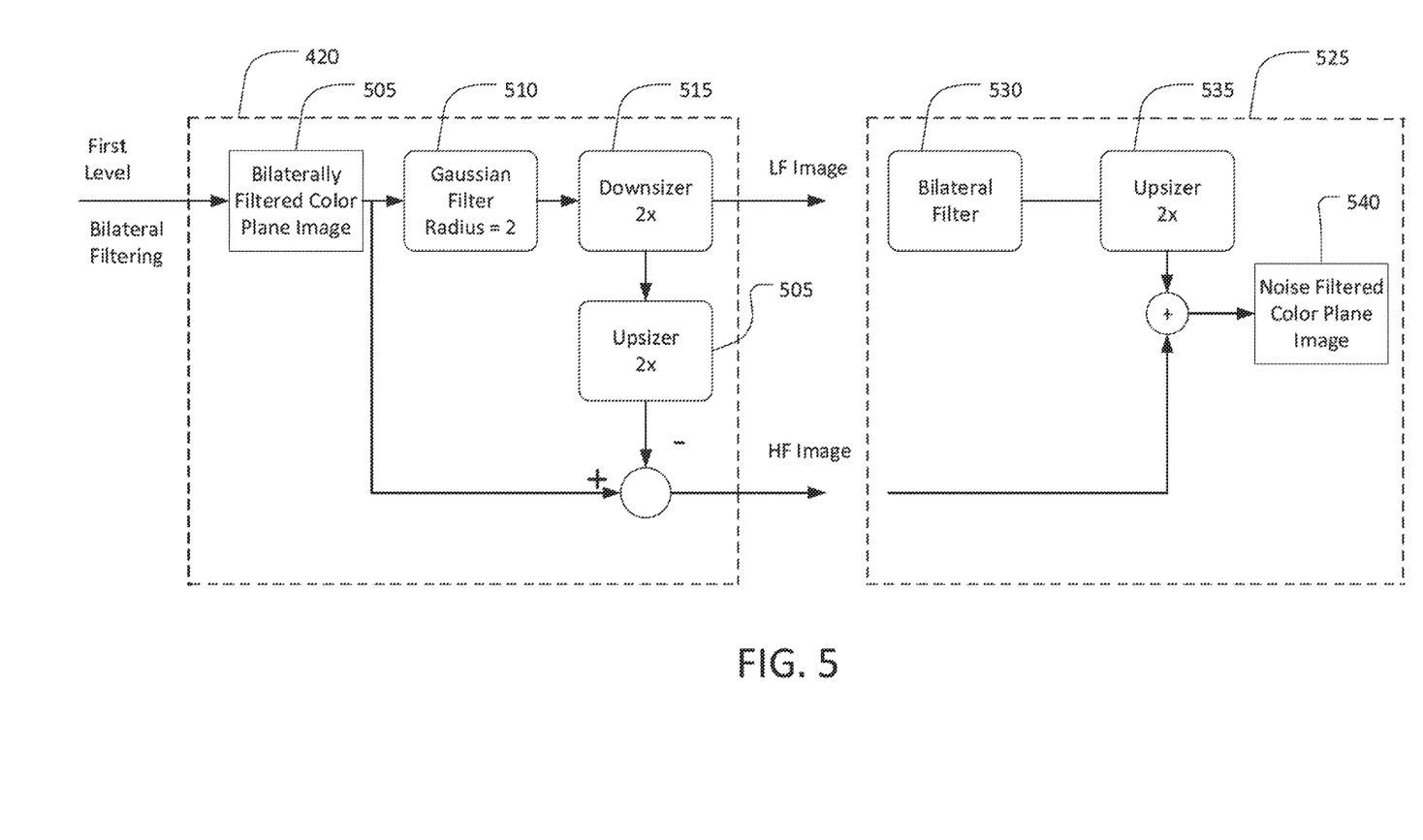
FIG. 5 shows a schematic illustration of a method for frequency splitting according to an exemplary embodiment of the invention.

FIG. 5 shows a schematic illustration of a method for frequency splitting. The method is performed by frequency splitter 420 on a bilaterally filtered first level color plane image 410. However, frequency splitter 430 operates similarly on the bilaterally filtered second level low frequency color plane image.

Generally, frequency splitting is an invertible process that creates a low frequency image and a residual high frequency image. Downsize and upsize operations are bi-linear. The bilateral filter described is effective in cleaning noise within the spatial frequency domain of the kernel size. However, support for larger spatial frequencies is minimal. Filtering lower frequency noise is achieved by downsizing the image by some factor and re-filtering. The downsizing process splits the image data into two spatial frequency bands: low and high. There are many methods that can be used for separating an image into high and low spatial frequency bands. One such method is described below in further detail. It is also advantageous to the extent possible to match the frequency split with the spatial frequency support of the bilateral filter. This insures uniform noise cleaning across all spatial frequencies.

As shown in FIG. 5, the bilaterally filtered color plane image 505 is provided to Gaussian filter 510 with a radius 2. The bilaterally filtered color plane image 505 filtered by Gaussian filter 510 is two times downsized by downsizer 515 to generate the first level low frequency color plane image. The color plane image downsized by downsizer 515 is two times upsized by upsizer 520 and respective pixel values are subtracted from corresponding pixel values of the color plane image 505 to generate the first level high frequency color plane image. The first level low and high frequency color plane images are provided to the next level(s) to be subsequently processed by the highest noise cleaning level 525 where the respective low frequency color plane image is provided to bilateral filter 530 to be upsized by upsizer 535. The color plane image upsized by upsizer 535 is added to the high frequency color plane image(s) from the previous level(s). If more than two levels are present, additional upsizers (not shown) may be provided, similar to the upsizer 445 in FIG. 4 to match the size of the low and high frequency color plane images. As a result, noise filtered color plane image 540 is generated.

Figure 6:
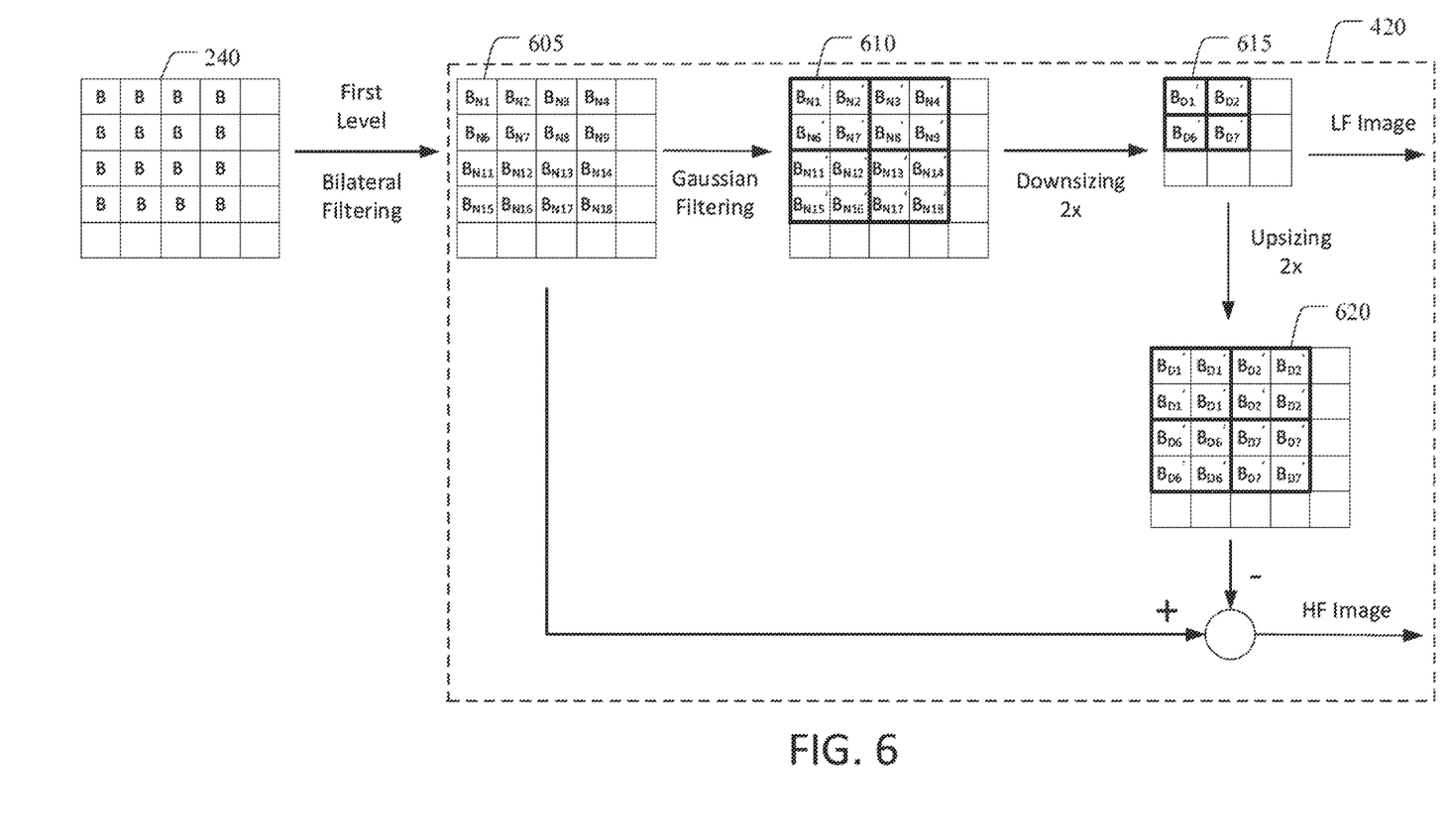
FIG. 6 shows a detailed illustration of the method for frequency splitting according to an exemplary embodiment of the invention.

FIG. 6 shows a detailed illustration of the method for frequency splitting performed by frequency splitter 420. As shown in FIG. 6, blue color plane image 240 is bilaterally filtered in the first level by bilateral filter 415 and provided as bilaterally filtered image 605 to frequency splitter 420.

Some pixels of bilaterally filtered image 605 are numbered as $B_{N1}$ to $B_{N18}$ to illustrate how these pixels are processed by the frequency splitter 420 to obtain blue color low and high frequency color plane images of the blue color plane image of the first level. Frequency splitters of higher levels operate analogously.

The pixels $B_{N1}$ to $B_{N18}$ are Gaussian filtered and result in Gaussian filtered pixels $B_{N1}'$ to $B_{N18}'$ of Gaussian filtered color plane image 610. The Gaussian filtered pixels are grouped and the Gaussian filtered color plane image 610 is downsized to color plane image 615 by calculating average values of groups of four pixels of the Gaussian filtered color plane image 610. For example, pixel $B_{D1}'$ of downsized image 615 represents an average value of pixels $B_{N1}'$, $B_{N2}'$, $B_{N6}'$, and $B_{N7}'$ of Gaussian filtered color plane image 610. Similarly, pixel $B_{D2}'$ of downsized image 615 represents an average value of pixels $B_{N3}'$, $B_{N4}'$, $B_{N8}'$, and $B_{N9}'$. Pixels $B_{D2}'$, $B_{D6}'$, and $B_{D7}'$ are pixels of the first level low frequency blue color plane image (LF Image) provided to the next noise reduction level.

To generate the first level high frequency blue color plane image, each of the pixels $B_{D1}'$, $B_{D2}'$, $B_{D6}'$, and $B_{D7}'$ of the downsized image 615 is upsized twice, i.e., the pixels are duplicated twice to generate upsized color plane image 620. The pixel values of the upsized color plane image 620 are subtracted from the pixel values of the bilaterally filtered image 605 which results in the first level high frequency color plane image (HF Image) that is provided to the next noise reduction level.

Figure 7:
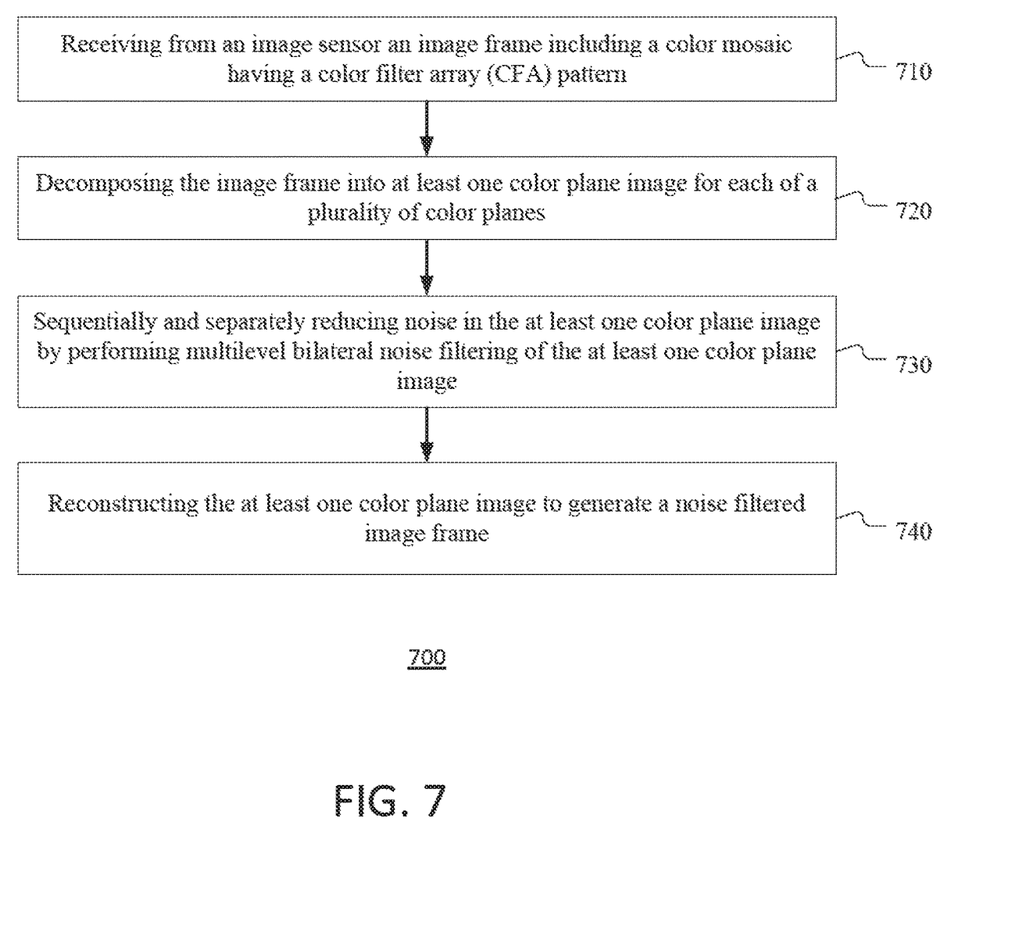
FIG. 7 is a flow chart depicting operations performed by the image processing apparatus to noise filter digital images according to an exemplary embodiment of the invention.

Reference is now made to FIG. 7 (with continued reference to FIGS. 1, 2, and 3), which illustrates a flow chart for method 700 for noise filtering digital images. Method 700 is performed by image processors 130 and 342 for each color plane image. Method 700 begins at step 710 where the image processors 130 and 342 receive an image frame including a color mosaic having a CFA pattern via image pre-buffer 120 (or still image pre-buffer 334, respectively) from the image sensor 110. Method 700 continues to step 720 at which the image frame is decomposed by the image processors 130 and 342 into at least one color plane image for each of a plurality of color planes, i.e., in red color plane image 220, green color plane image 230, and blue color plane image 240.

At step 730, noise in the at least one color plane image is sequentially and separately reduced by performing multi-level bilateral noise filtering of the at least one color plane image. The method concludes with step 740 at which the at least one color plane image is reconstructed to generate a noise filtered image frame.

Referring back to FIG. 1, memory 150 is described in more detail. According to an exemplary embodiment of the invention, memory 150 is a non-transitory computer readable storage media encoded with software including computer executable instructions that when executed by image processor 130 cause the image processor 130 to receive from the image sensor 110 an image frame including a color mosaic having a CFA pattern, decompose the image frame into at least one color plane image 220, 230, and 240 for each of a plurality of color planes, sequentially and separately reduce noise in the at least one color plane image by performing multilevel bilateral noise filtering of the at least one color plane image; and reconstruct the at least one color plane image to generate a noise filtered image frame, e.g., noise filtered color plane image 405. Image processor 130 may be implemented as a single processor or as a plurality of processors.

In summary, techniques for multi-level bilateral noise filtering of digital images are provided which are more effective than existing noise cleaning methods, in particular in high frequency bands. The multi-level approach is effective in removing noise from the remaining frequency bands. Scaling the noise cleaning at each pixel allows for the proper amount of noise cleaning in shadows and highlights of the digital images. By arranging the multi-level bilateral noise filters before the ISPs in which the noise filtered image frames are demosaiced, more efficient noise filtering can be performed since the noise in the CFA space is less correlated than the noise that has been mixed from either demosaicing, or channel mixing as part of the color correction processing. As a result, the overall functionality of the image processing apparatus and the quality of the resulting full color images can be significantly improved.

It is understood that the foregoing description is that of the exemplary embodiments of the invention and that various changes and modifications may be made thereto without departing from the spirit and scope of the invention as defined in the appended claims.

What is claimed is:

1. A method for multilevel bilateral noise filtering of digital images, the method comprising:
   receiving from an image sensor an image frame including a color mosaic having a color filter array (CFA) pattern;
   decomposing the image frame into at least one color plane image for each of a plurality of color planes;
   sequentially and separately reducing noise in the at least one color plane image by performing multilevel bilateral noise filtering of the at least one color plane image, wherein the performing of the multilevel bilateral noise filtering comprises performing frequency splitting of the at least one color plane image in each of a plurality of noise cleaning levels except for a highest noise cleaning level, and wherein the frequency splitting includes Gaussian filtering of the at least one color plane image, downsizing and upsizing the Gaussian filtered at least one color plane image; and
   reconstructing the at least one color plane image to generate a noise filtered image frame.

2. The method of claim 1, wherein the plurality of color planes includes at least one of a green color plane, a red color plane, and a blue color plane.

3. The method of claim 1, wherein performing the multilevel bilateral noise filtering comprises:
   defining a plurality of noise cleaning levels;
   bilaterally filtering the at least one color plane image in each of the plurality of noise cleaning levels; and
   performing frequency splitting of the at least one color plane image in each of the plurality of noise cleaning levels except for a highest noise cleaning level.

4. The method of claim 3, wherein frequency splitting comprises:
   in a first noise cleaning level, performing the Gaussian filtering of the at least one color plane image, dividing the at least one color plane image into low and high frequency color plane images, the low frequency color plane image being generated by the downsizing the Gaussian filtered at least one color plane image, and the high frequency color plane image being generated by the upsizing the low frequency color plane image and subtracting respective pixel values of the upsized low frequency color plane from corresponding pixel values of the at least one color plane image, and forwarding the low frequency color plane image to a subsequent level of the plurality of noise cleaning levels and the high frequency color plane image to the highest noise cleaning level; and in at least one noise cleaning level subsequent to the first noise cleaning level and preceding the highest noise cleaning level, performing Gaussian filtering of the low frequency color plane image received from a preceding level of the plurality of noise cleaning levels, dividing the Gaussian filtered low frequency color plane image from the preceding level of the plurality of noise cleaning levels into the low and high frequency color plane images, the low frequency color plane images being generated by downsizing the Gaussian filtered low frequency color plane image from the preceding level of the plurality of noise cleaning levels, and the high frequency color plane image being generated by upsizing the low frequency color plane image, and forwarding the low frequency color plane image to the subsequent level of the plurality of noise cleaning levels and the high frequency color plane image to the highest noise cleaning level.

5. The method of claim 4, further comprising:
in the highest noise cleaning level, bilaterally filtering the low frequency color plane image received from an immediately preceding noise cleaning level, upsizing the low frequency color plane image received from the immediately preceding noise cleaning level; and
reconstructing the at least one color plane image by adding high frequency color plane images received from each of the preceding noise cleaning levels to the bilaterally filtered and upsized low frequency color plane image received from the immediately preceding noise cleaning level.

6. The method of claim 3, wherein bilaterally filtering comprises:
defining a kernel of a target pixel, the kernel having a square width size and including the target pixel and kernel pixels;
subsequently processing each pixel of the at least one color plane image as the target pixel by determining a weighted averaged pixel value for the target pixel, the weighted averaged pixel value for the target pixel being determined by applying weights to values of each kernel pixel and by subsequently averaging the weighted kernel pixel values.

7. The method of claim 6, wherein:
a weight for a kernel pixel is determined based on a distance of the kernel pixel from the target pixel and based on a z-score defining a similarity of the value of the kernel pixel to the value of the value of the target pixel; and
the distance of the kernel pixel from the target pixel is determined to be consistent with spatial gaps in the color mosaic having the CFA pattern.

8. The method of claim 7, wherein:
the weight for the kernel pixel is determined based on:

$$\text{Weights}(\rho) = \sum_{p \in \text{Kernel}} e^{-\left(\left(\frac{\Delta r}{\sqrt{2} \cdot \text{ThrottleR\_ML}}\right)^2 + \left(\frac{\Delta v}{\sigma[I(x,y)] \cdot \text{ThrottleS\_ML} \cdot 2^{-\text{level}}}\right)^2\right)},$$

wherein ThrottleR_ML defines a Gaussian radius, ThrottleS_ML defines a pixel similarity, $\Delta r$ defines a distance in pixels from the kernel, I(x,y) defines the target pixel centered in the kernel, $\Delta v$ defines a code value difference, $\sigma[I(x,y)]$ defines a noise table, and level defines the noise cleaning level.

9. An image processing apparatus comprising:
one or more processors in communication with an image sensor;
one or more memory devices in communication with the one or more processors;
wherein the one or more processors are configured to:
receive from the image sensor an image frame including a color mosaic having a color filter array (CFA) pattern;
decompose the image frame into at least one color plane image for each of a plurality of color planes;
sequentially and separately reduce noise in the at least one color plane image by performing multilevel bilateral noise filtering of the at least one color plane image, wherein the performing of the multilevel bilateral noise filtering comprises performing frequency splitting of the at least one color plane image in each of a plurality of noise cleaning levels except for a highest noise cleaning level, and wherein the frequency splitting includes Gaussian filtering of the at least one color plane image, downsizing and upsizing the Gaussian filtered at least one color plane image; and
reconstruct the at least one color plane image to generate a noise filtered image frame.

10. The image processing apparatus of claim 9, wherein the plurality of color planes includes at least one of a green color plane, a red color plane, and a blue color plane.

11. The image processing apparatus of claim 9, wherein, to perform the multilevel bilateral noise filtering, the one or more processors are configured to:
define a plurality of noise cleaning levels;
bilaterally filter the at least one color plane image in each of the plurality of noise cleaning levels; and
perform frequency splitting of the at least one color plane image in each of the plurality of noise cleaning levels except for a highest noise cleaning level.

12. The image processing apparatus of claim 11, wherein, to perform the frequency splitting, the one or more processors are configured to:
in a first noise cleaning level, perform the Gaussian filtering of the at least one color plane image, divide the at least one color plane image into low and high frequency color plane images, the low frequency color plane image being generated by the downsizing the Gaussian filtered at least one color plane image, and the high frequency color plane image being generated by the upsizing the low frequency color plane image and subtracting respective pixel values of the upsized low frequency color plane from corresponding pixel values of the at least one color plane image, and forward the low frequency color plane image to a subsequent level of the plurality of noise cleaning levels and the high frequency color plane image to the highest noise cleaning level; and
in at least one noise cleaning level subsequent to the first noise cleaning level and preceding the highest noise cleaning level, perform Gaussian filtering of the low frequency color plane image received from a preceding level of the plurality of noise cleaning levels, divide the Gaussian filtered low frequency color plane image from the preceding level of the plurality of noise cleaning levels into the low and high frequency color plane images, the low frequency color plane images being generated by downsizing the Gaussian filtered low frequency color plane image from the preceding level of the plurality of noise cleaning levels, and the high frequency color plane image being generated by upsizing the low frequency color plane image, and forward the low frequency color plane image to the subsequent level of the plurality of noise cleaning levels and the high frequency color plane image to the highest noise cleaning level.

13. The image processing apparatus of claim 12, wherein the one or more processors are further configured to:
in the highest noise cleaning level, bilaterally filter the low frequency color plane image received from an immediately preceding noise cleaning level, upsize the low frequency color plane image received from the immediately preceding noise cleaning level; and
reconstruct the at least one color plane image by adding high frequency color plane images received from each of the preceding noise cleaning levels to the bilaterally filtered and upsized low frequency color plane image received from the immediately preceding noise cleaning level.

14. The image processing apparatus of claim 11, wherein, to bilaterally filter the low frequency color plane image, the one or more processors are further configured to:
define a kernel of a target pixel, the kernel having a square width size and including the target pixel and kernel pixels;
subsequently process each pixel of the at least one color plane image as the target pixel by determining a weighted averaged pixel value for the target pixel, the weighted averaged pixel value for the target pixel being determined by applying weights to values of each kernel pixel and by subsequently averaging the weighted kernel pixel values.

15. A non-transitory computer readable storage medium encoded with software comprising computer executable instructions that when executed by one or more processors cause the one or more processors to:
receive from the image sensor an image frame including a color mosaic having a color filter array (CFA) pattern;
decompose the image frame into at least one color plane image for each of a plurality of color planes;
sequentially and separately reduce noise in the at least one color plane image by performing multilevel bilateral noise filtering of the at least one color plane image, wherein the performing of the multilevel bilateral noise filtering comprises performing frequency splitting of the at least one color plane image in each of a plurality of noise cleaning levels except for a highest noise cleaning level, and wherein the frequency splitting includes Gaussian filtering of the at least one color plane image, downsizing and upsizing the Gaussian filtered at least one color plane image; and
reconstruct the at least one color plane image to generate a noise filtered image frame.

16. The non-transitory computer readable storage medium of claim 15, wherein the plurality of color planes includes at least one of a green color plane, a red color plane, and a blue color plane.

17. The non-transitory computer readable storage medium of claim 15, wherein, to perform the multilevel bilateral noise filtering, the executable instructions further cause the one or more processors to:
define a plurality of noise cleaning levels;
bilaterally filter the at least one color plane image in each of the plurality of noise cleaning levels; and
perform frequency splitting of the at least one color plane image in each of the plurality of noise cleaning levels except for a highest noise cleaning level.

18. The non-transitory computer readable storage medium of claim 17, wherein, to perform the frequency splitting, the executable instructions further cause the one or more processors to:
in a first noise cleaning level, perform the Gaussian filtering of the at least one color plane image, divide the at least one color plane image into low and high frequency color plane images, the low frequency color plane image being generated by the downsizing the Gaussian filtered at least one color plane image, and the high frequency color plane image being generated by the upsizing the low frequency color plane image and subtracting respective pixel values of the upsized low frequency color plane from corresponding pixel values of the at least one color plane image, and forward the low frequency color plane image to a subsequent level of the plurality of noise cleaning levels and the high frequency color plane image to the highest noise cleaning level; and
in at least one noise cleaning level subsequent to the first noise cleaning level and preceding the highest noise cleaning level, perform Gaussian filtering of the low frequency color plane image received from a preceding level of the plurality of noise cleaning levels, divide the Gaussian filtered low frequency color plane image from the preceding level of the plurality of noise cleaning levels into the low and high frequency color plane images, the low frequency color plane images being generated by downsizing the Gaussian filtered low frequency color plane image from the preceding level of the plurality of noise cleaning levels, and the high frequency color plane image being generated by upsizing the low frequency color plane image, and forward the low frequency color plane image to the subsequent level of the plurality of noise cleaning levels and the high frequency color plane image to the highest noise cleaning level.

19. The non-transitory computer readable storage medium of claim 18, the executable instructions further cause the one or more processors to:
in the highest noise cleaning level, bilaterally filter the low frequency color plane image received from an immediately preceding noise cleaning level, upsize the low frequency color plane image received from the immediately preceding noise cleaning level; and
reconstruct the at least one color plane image by adding high frequency color plane images received from each of the preceding noise cleaning levels to the bilaterally filtered and upsized low frequency color plane image received from the immediately preceding noise cleaning level.

20. The non-transitory computer readable storage medium of claim 17, wherein, to bilaterally filter the low frequency color plane image, the executable instructions further cause the one or more processors to:
define a kernel of a target pixel, the kernel having a square width size and including the target pixel and kernel pixels;
subsequently process each pixel of the at least one color plane image as the target pixel by determining a weighted averaged pixel value for the target pixel, the weighted averaged pixel value for the target pixel being determined by applying weights to values of each kernel pixel and by subsequently averaging the weighted kernel pixel values, determine a weight for a kernel pixel based on a distance of the kernel pixel from the target pixel and based on a z-score defining a similarity of the value of the kernel pixel to the value of the value of the target pixel; and determine the distance of the kernel pixel from the target pixel to be consistent with spatial gaps in the color mosaic having the color filter array (CFA) pattern.

* * * * *